(12) United States Patent
Takeishi

(10) Patent No.: US 8,659,793 B2
(45) Date of Patent: Feb. 25, 2014

(54) IMAGE PROCESSING APPARATUS AND IMAGE PROCESSING METHOD

(75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/197,643

(22) Filed: Aug. 3, 2011

(65) Prior Publication Data

US 2012/0050763 A1    Mar. 1, 2012

(30) Foreign Application Priority Data

Aug. 26, 2010  (JP) ................................. 2010-189984

(51) Int. Cl.
*H04N 1/60* (2006.01)

(52) U.S. Cl.
USPC ............ 358/1.9; 382/232; 382/251; 382/239; 382/166

(58) Field of Classification Search
USPC ...................................... 358/1.15, 1.14, 1.13
See application file for complete search history.

(56) References Cited

U.S. PATENT DOCUMENTS

| | | | |
|---|---|---|---|
| 5,625,759 A | 4/1997 | Freeman | |
| 6,243,416 B1 | 6/2001 | Matsushiro et al. | 375/240 |
| 6,373,890 B1 | 4/2002 | Freeman | |
| 6,658,156 B1 * | 12/2003 | Aritomi | 382/239 |
| 6,750,867 B1 * | 6/2004 | Gibson | 345/501 |
| 7,085,006 B2 | 8/2006 | Yokoyama et al. | |
| 7,236,636 B2 * | 6/2007 | Sakai et al. | 382/238 |
| 7,652,800 B2 * | 1/2010 | Shoda et al. | 358/451 |
| 8,331,705 B2 | 12/2012 | Shiraishi et al. | |
| 8,452,085 B2 | 5/2013 | Itoh | |
| 2001/0053249 A1 | 12/2001 | Krishnamachari | |
| 2002/0047850 A1 | 4/2002 | Yoshioka | |
| 2003/0161541 A1 | 8/2003 | Ridge | |
| 2005/0069214 A1 * | 3/2005 | Hayashi | 382/251 |

(Continued)

FOREIGN PATENT DOCUMENTS

| | | |
|---|---|---|
| JP | 10-257488 | 9/1998 |
| JP | 2004-104621 | 4/2004 |

(Continued)

OTHER PUBLICATIONS

U.S. Appl. No. 13/255,238, filed Sep. 7, 2011 by Hirokazu Tamura.

(Continued)

*Primary Examiner* — Vincent Rudolph
*Assistant Examiner* — Richa Mishra
(74) *Attorney, Agent, or Firm* — Fitzpatrick, Cella, Harper & Scinto

(57) ABSTRACT

Image data is divided into blocks each of a 2×2 pixel size, and color-reduction processing is performed for the target block based on color data and attribute data of respective pixels forming the target block. A pattern flag indicating the layout pattern of color data contained in the target block is specified by comparing the color data of the respective pixels in the target block having undergone the color-reduction processing. Color data corresponding to a pixel at a position defined in advance in the block having undergone the color-reduction processing is extracted as color data of the first color. When it is determined that the number of colors in the block is one of two to four, color data of the second to fourth colors are extracted. The pattern flag, the color data of the first color of the block, and those of the second to fourth colors of the block are output.

11 Claims, 16 Drawing Sheets

(56) References Cited

U.S. PATENT DOCUMENTS

| | | |
|---|---|---|
| 2005/0237951 A1 | 10/2005 | Yang et al. |
| 2006/0023960 A1 | 2/2006 | Eschbach et al. |
| 2008/0100624 A1 | 5/2008 | Matsunaga ............... 345/469.1 |
| 2008/0259359 A1 | 10/2008 | Tamura ........................ 358/1.1 |
| 2008/0273212 A1 | 11/2008 | Takeishi ....................... 358/1.9 |
| 2009/0097072 A1 | 4/2009 | Tamura ...................... 358/3.01 |
| 2009/0110320 A1 | 4/2009 | Campbell et al. |
| 2009/0323132 A1 | 12/2009 | Yano et al. .................... 358/466 |
| 2010/0067790 A1 | 3/2010 | Yamamoto ................... 382/166 |
| 2010/0124380 A1 | 5/2010 | Shiraishi et al. |
| 2010/0128295 A1 | 5/2010 | Tamura ....................... 358/1.12 |
| 2010/0172583 A1* | 7/2010 | Shimauchi et al. ........... 382/166 |
| 2011/0064320 A1* | 3/2011 | Ikuno ........................... 382/232 |
| 2011/0109942 A1 | 5/2011 | Kashibuchi et al. ......... 358/3.13 |
| 2011/0188750 A1 | 8/2011 | Tamura ........................ 382/167 |
| 2011/0222082 A1 | 9/2011 | Tomi |
| 2012/0014597 A1 | 1/2012 | Matsunaga |
| 2012/0050763 A1 | 3/2012 | Takeishi |

FOREIGN PATENT DOCUMENTS

| | | |
|---|---|---|
| JP | 2008-271046 | 11/2008 |
| JP | 2010-74406 | 4/2010 |
| JP | 2011-71767 | 4/2011 |

OTHER PUBLICATIONS

U.S. Appl. No. 13/177,464, filed Jul. 6, 2011 by Daisuke Matsunaga.

* cited by examiner

F I G. 4
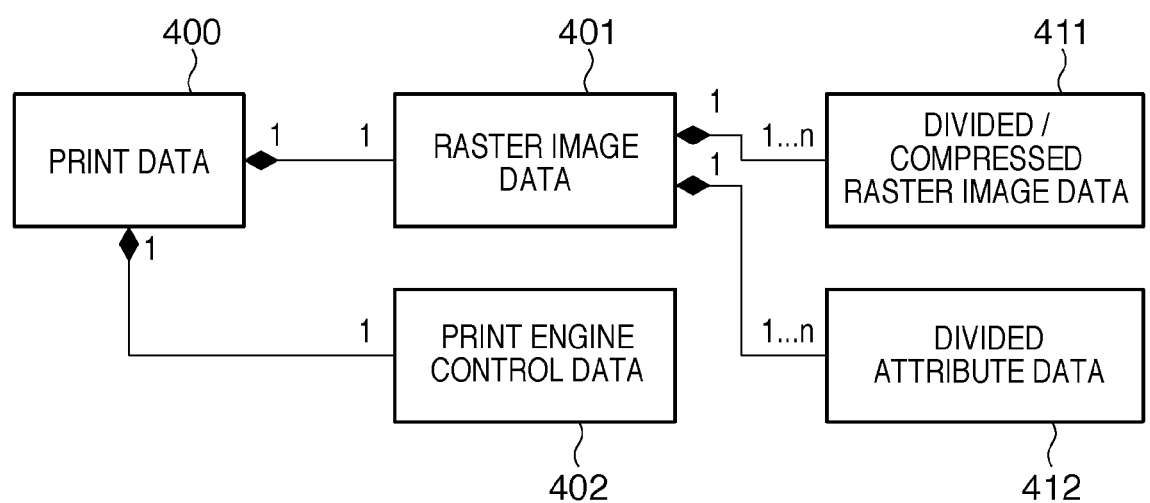

| IMAGE ATTRIBUTE | GRAPHIC ATTRIBUTE | TEXT ATTRIBUTE |
|---|---|---|
| FIRST BIT | SECOND BIT | THIRD BIT |

FIG. 12

| IMAGE (FLAG) | |
|---|---|
| (0) | SAME COLOR FOR ALL PIXELS : ONE PATTERN |
| (1) (2) (3) (4) (5) (6) (7) | TWO COLORS : SEVEN PATTERNS |
| (8) (9) (A) (B) (C) (D) | THREE COLORS : SIX PATTERNS |
| (E) | DIFFERENT COLORS FOR ALL PIXELS : ONE PATTERN |

| | GRAPHIC | TEXT | IMAGE |
|---|---|---|---|
| ATTRIBUTE WEIGHT VALUE | 2 | 2 | 1 |

FIG. 18
| ATTRIBUTE PATTERN | ATTRIBUTE INFORMATION DISTANCE PARAMETER (Dz) |
|---|---|
|  | 3 |
|  | 3 |
|  | 2 |
|  | 2 |
|  | 2 |
|  | 2 |
|  | 2 |
|  | 2 |
|  | 2 |
|  | 2 |
|  | 1 |
 TEXT ATTRIBUTE
 ATTRIBUTES OTHER THAN TEXT

FIG. 21

| ATTRIBUTE PATTERN | BLOCK SHAPE |

| TEXT ATTRIBUTE | BLOCK CLUSTER 1 |
| ATTRIBUTES OTHER THAN TEXT | BLOCK CLUSTER 2 |

IMAGE PROCESSING APPARATUS AND IMAGE PROCESSING METHOD

BACKGROUND OF THE INVENTION

1. Field of the Invention

The present invention relates to speeding-up and image quality improvement in image processing and rendering processing for image formation.

2. Description of the Related Art

Processing regarding conventional image formation processing will be explained. First, an image forming apparatus receives PDL (Page Description Language) data. The PDL data is generated by an information processing apparatus generally called a personal computer (PC), and input to the image forming apparatus via a network or external storage medium. For example, the image forming apparatus can receive PDL data via a network interface, or acquire PDL data by connecting, to the USB interface of the image forming apparatus, a USB memory which saves the PDL data.

Then, a general-purpose processor in the image forming apparatus interprets the received PDL data. The general-purpose processor is a processor implemented by a von Neumann computer algorithm. The general-purpose processor can execute various arithmetic operations based on received instructions for received data.

Based on the interpretation result, the general-purpose processor or a RIP ASIC in the image forming apparatus executes rendering processing, obtaining raster image data. An image processing ASIC or the general-purpose processor in the image forming apparatus performs image processing (for example, image processing to print by the print engine of the apparatus) for the raster image data, obtaining raster image data having undergone the image processing. The raster image data having undergone the image processing is transferred to the print engine in the image forming apparatus. The print engine forms an image using the raster image data on a printing medium typified by paper.

The above-described rendering processing and image processing conventionally perform image compression processing to reduce the data amount to be saved in or loaded from a main memory, another storage device, or a medium, and increase the transfer speed.

The image compression processing adopts a lossy compression technique "JPEG (Joint Photographic Experts Group)" or the like. However, JPEG is accompanied by inverse DCT (Discrete Cosine Transform) and thus upsizes and complicates hardware and software.

As a method of decreasing the data amount without using inverse DCT (Discrete Cosine Transform) or the like, the data amount may be reduced by color-reduction processing (Japanese Patent Laid-Open No. 2008-271046). This method compresses the data amount by dividing image data into blocks each of 2×2 pixels, decreasing the number of colors of each divided block to two or less, and outputting color data of two colors and shape information about the layout of the two colors.

When PDL (Page Description Language) data is interpreted and rasterized into raster image data, the attribute (text, graphic (line image), or image (for example, photograph or pattern)) of each pixel is obtained. However, in Japanese Patent Laid-Open No. 2008-271046, the number of colors is decreased to two or less without taking account of the attribute of each pixel. When pixels with different attributes exist within one block, if color-reduction processing is performed without considering the attributes, pixels with different attributes may be changed to have the same color (same pixel value). If a portion (contour of a text or graphic) where contour information greatly affects the image quality is changed to have the same color as that of a background image, the contour becomes unclear, degrading the image quality.

SUMMARY OF THE INVENTION

The present invention is to provide an apparatus and method capable of compression processing that increases both the image quality and compression ratio while suppressing the cost of processing.

According to one aspect of the present invention, there is provided an image processing apparatus comprising: a color-reduction processing unit which divides image data into blocks each of a 2×2 pixel size, sequentially targets the divided blocks, and performs color-reduction processing for the target block based on color data and attribute data of respective pixels forming the target block; a specifying unit which specifies a pattern flag indicating a layout pattern of color data contained in the target block by comparing the color data of the respective pixels in the target block having undergone the color-reduction processing by the color-reduction processing unit; an extraction unit which extracts, as color data of a first color, color data corresponding to a pixel at a position defined in advance in the block of the 2×2 pixel size having undergone the color-reduction processing by the color-reduction processing unit, and when the number of colors contained in the block having undergone the color-reduction processing is determined to be one of two to four, extracts color data of second to fourth colors corresponding to the layout pattern defined for the specified pattern flag; and an output unit which outputs the pattern flag of the block that has been specified by the specifying unit, the color data of the first color of the block that has been extracted by the extraction unit, and the color data of the second to fourth colors of the block that have been extracted by the extraction unit.

Further features of the present invention will become apparent from the following description of exemplary embodiments (with reference to the attached drawings).

BRIEF DESCRIPTION OF THE DRAWINGS

FIG. 4 is a view showing the structure of print data;

FIG. 12 is a view showing a divided 2×2 pixel block;

FIG. 18 is a table showing an attribute pattern and attribute data weight value;

FIG. 21 is a table showing an attribute pattern and block shape.

DESCRIPTION OF THE EMBODIMENTS

Preferred embodiments of the present invention will now be described in detail with reference to the accompanying drawings.

Image Formation Processing

Figure 1:
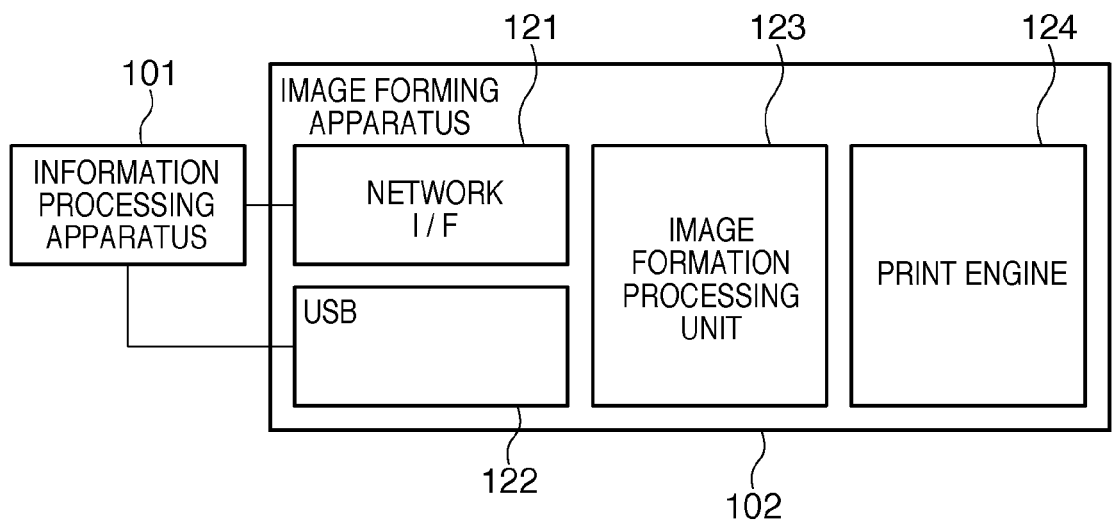
FIG. 1 is a block diagram showing the schematic arrangement of an image forming apparatus and an information processing apparatus.

FIG. 1 is a block diagram showing the schematic arrangement of an image forming apparatus 102 and an information processing apparatus 101 connected to the image forming apparatus 102 according to the present invention. The information processing apparatus 101 is a personal computer (PC), workstation, or the like, and can generate PDL (Page Description Language) data. The information processing apparatus 101 can transfer information containing PDL data to an external apparatus (image forming apparatus 102 in this example) via a network or an interface typified by a USB.

Figure 2:
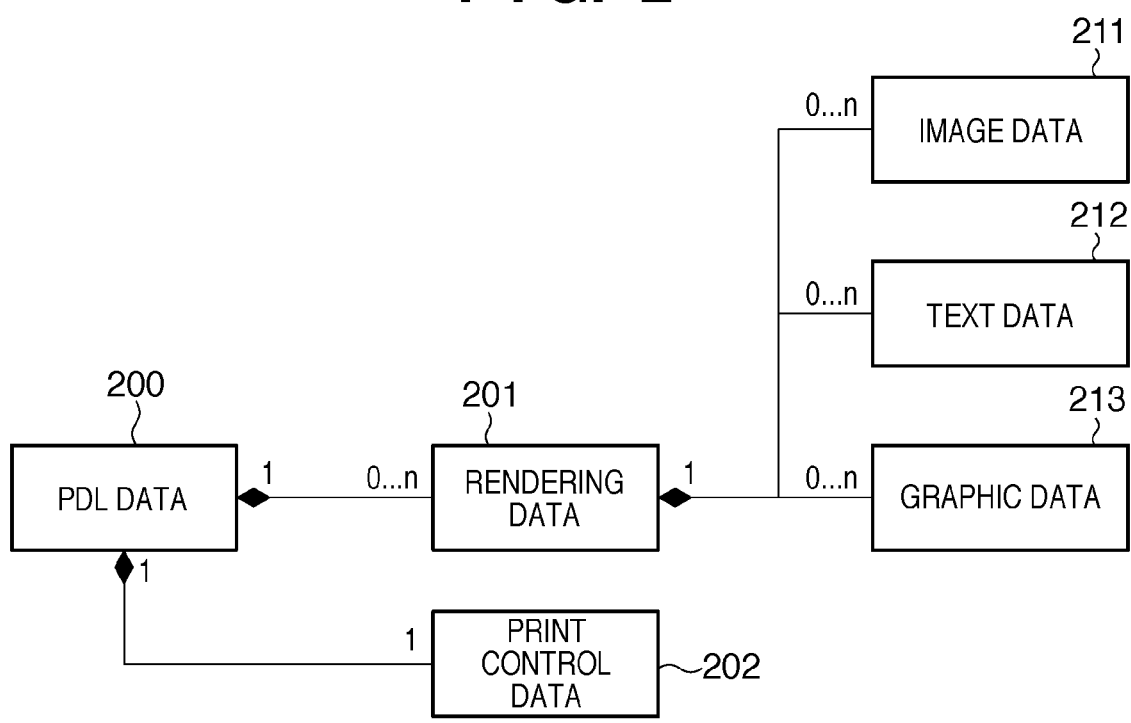
FIG. 2 is a view showing the structure of PDL data.

As shown in FIG. 2, PDL data 200 can have rendering data 201 and print control data 202. The rendering data 201 can have data which can be interpreted and visually rendered by an image formation processing unit 123 to be described later.

The rendering data 201 can have image data 211, text data 212, and graphic data 213. The image data 211 is data (for example, photograph or pattern) representing a discretely sampled visible image. The text data 212 is data having information expressible as a visible letter form. The graphic data 213 represents a graphic (line image) expressed by a path sequence or a graphic expressed by a function that has discrete real number solutions. To express the graphic data 213, the embodiment can adopt the following methods.

forming a closed space defined by a plurality of line segments forming a closed space expressed by a function having one or more discrete real number solutions using width information and one or more line segments a circle and ellipse Needless to say, the present invention can be implemented for other expressible graphics in addition to those listed above. Also, the present invention can be implemented even for one or more expressible graphics from among the above examples.

In expression by a function having real number solutions, PDL data indicates a function capable of mapping on paper. For example, the embodiment can employ a cubic Bezier curve having real number solutions. In general, a Bezier curve is defined by:

$$P(t) = \sum_{i=0}^{n-1} B_i \cdot J_{(N-1)i}(t)$$

An image formation processing unit 123 obtains real number solutions in accordance with this equation, thus obtaining a coordinate point sequence necessary to generate raster image data.

The print control data 202 can have information indicating a method of forming an image based on the PDL data 200. For example, this information includes information which designates the paper size and paper type, and information for processing after image formation, including a bookbinding processing method. Further, the print control data 202 can have setting information about color processing in image formation processing, setting information of a page range to form an image, and setting information of the resolution in image formation processing. The present invention can be practiced even if the print control data 202 can have less than or more than these pieces of information.

The arrangement of the image forming apparatus 102 shown in FIG. 1 will be explained. The image forming apparatus 102 is a printer or multi-function peripheral. The image forming apparatus 102 forms a visible image on a medium typified by paper based on print data typified by the PDL data 200.

The present invention can be practiced by an apparatus capable of forming a visible image on any medium, other than a printer or multi-function peripheral. Also, the present invention can be practiced by an apparatus connected to one capable of forming a visible image on any medium, other than a printer or multi-function peripheral.

Figure 3:
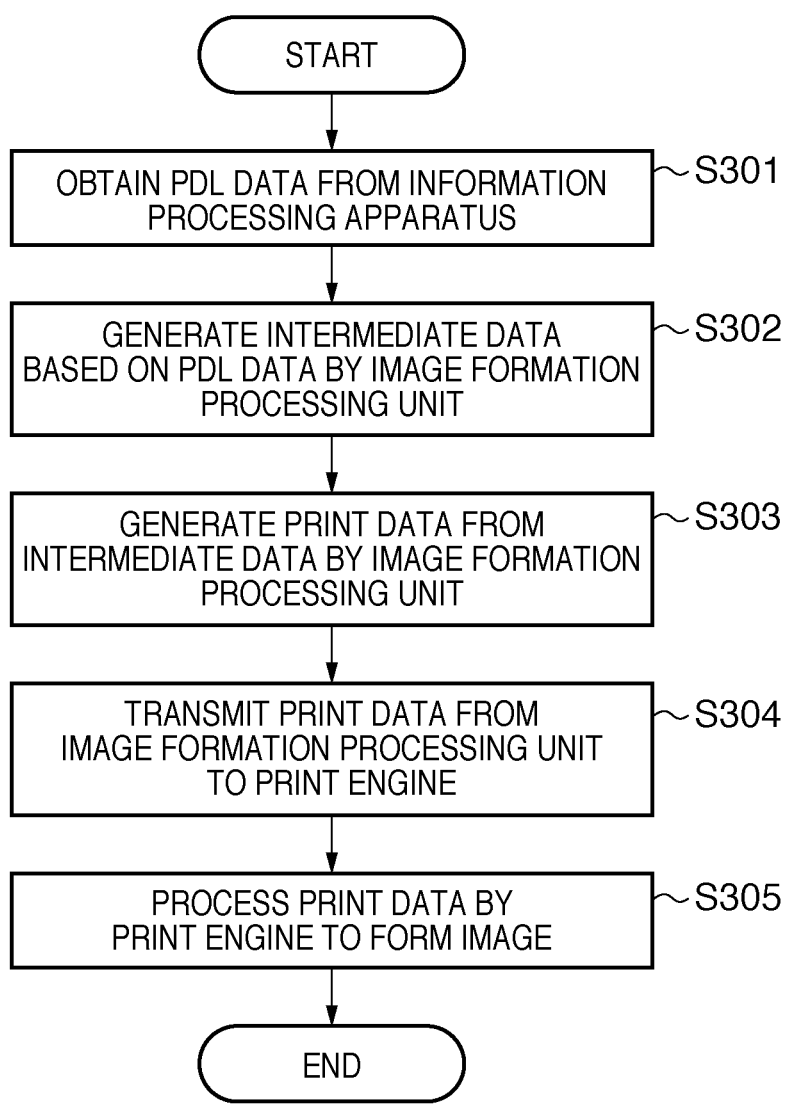
FIG. 3 is a flowchart showing image formation processing.

Image formation processes to form a visible image on a printing medium, and a processing unit which performs these processes in the image forming apparatus 102 will be explained. FIG. 3 is a flowchart showing image formation processing by the image forming apparatus 102. In step S301, the image forming apparatus 102 receives the PDL data 200 from the information processing apparatus 101 via a network interface (I/F) 121.

Note that data containing the PDL data 200 can also be acquired from another apparatus or a storage medium via a USB (Universal Serial Bus) 122. PDL data may be acquired using another interface.

In step S302, the PDL data 200 acquired in step S301 is sent to the image formation processing unit 123, and the image formation processing unit 123 generates intermediate data based on the PDL data 200. Details of the generated intermediate data will be described later with reference to FIG. 7.

In step S303, the image formation processing unit 123 generates print data based on the intermediate data. Details of the generated print data will be described later with reference to FIG. 4.

In step S304, the image formation processing unit 123 transmits the generated print data to a print engine. In step S305, a print engine 124 performs image formation based on the print data generated by the image formation processing unit 123, forming a visible image on a printing medium typified by paper.

An outline of image formation by the image forming apparatus 102 in the embodiment has been described. Next, details of the image formation processing unit 123 which executes the processes in steps S302 and S303 will be explained with reference to FIG. 5.

Figure 5:
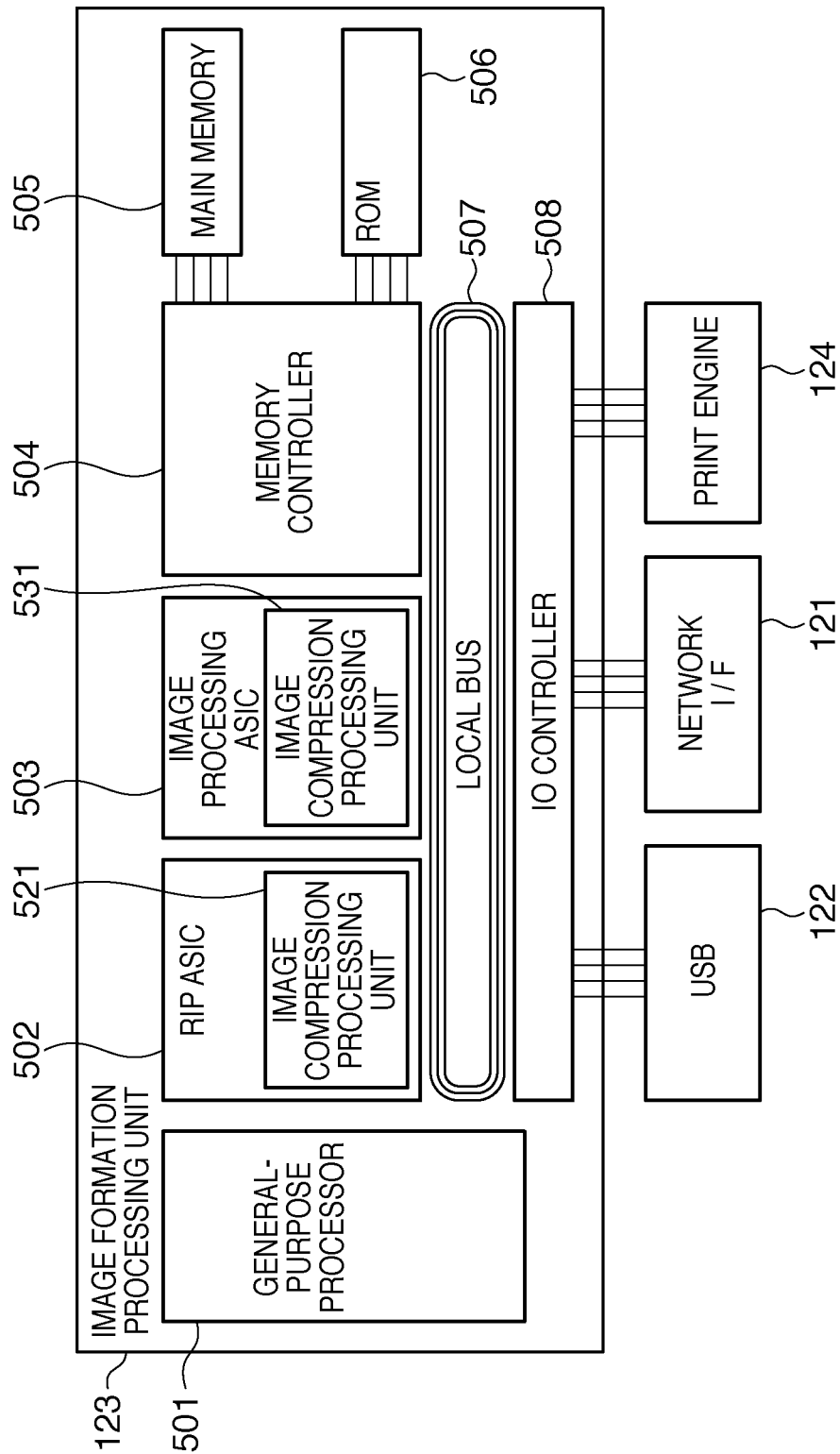
FIG. 5 is a block diagram showing the arrangement of an image formation processing unit.

FIG. 5 is a block diagram showing the arrangement of the image formation processing unit 123. The image formation processing unit 123 includes a general-purpose processor 501 typified by a CPU. The general-purpose processor 501 controls the overall image formation processing unit 123 via a local bus 507.

More specifically, the general-purpose processor 501 controls a RIP ASIC 502, image processing ASIC 503, and memory controller 504. By controlling the memory controller 504, the general-purpose processor 501 controls a main memory 505 and ROM 506. The general-purpose processor 501 controls an IO controller 508.

The general-purpose processor 501 generates intermediate data from received PDL data.

The RIP ASIC 502 receives intermediate data and generates print data 400 from the received intermediate data under the control of the general-purpose processor 501. At this time, an image compression processing unit 521 in the RIP ASIC 502 compresses raster image data generated based on the received image data, generating the print data 400.

The image processing ASIC 503 receives the print data 400 from the RIP ASIC 502, and performs, for the print data 400, image processing necessary to form an image by the print engine 124. If necessary, an image compression processing unit 531 in the image processing ASIC 503 decompresses the compressed raster image data contained in the received print data 400, performs image processing for the decompressed raster image, and then compresses the raster image again. Note that this image processing includes halftone processing, CMS processing, color space conversion processing, image compression processing, image decompression processing, and color space determination processing. Note that the present invention can be practiced even if the image processing ASIC 503 can perform less than or more than these processes.

The memory controller 504 controls access to the main memory 505 and ROM 506. More specifically, the memory controller 504 allows other building components connected to the local bus 507 to read out/write data from/in the main memory 505. Similarly, the memory controller 504 allows other building components connected to the local bus 507 to read out data from the ROM 506.

The IO controller 508 is an interface with the remaining units (units other than the image formation processing unit 123) in the image forming apparatus 102. More specifically, the IO controller 508 allows the building components connected to the local bus 507 in the image formation processing unit 123 to exchange data with the remaining units (units other than the image formation processing unit 123) in the image forming apparatus 102.

The local bus 507 connects the general-purpose processor 501, RIP ASIC 502, image processing ASIC 503, memory controller 504, and IO controller 508, and enables data exchange between these connected components.

Figure 6:
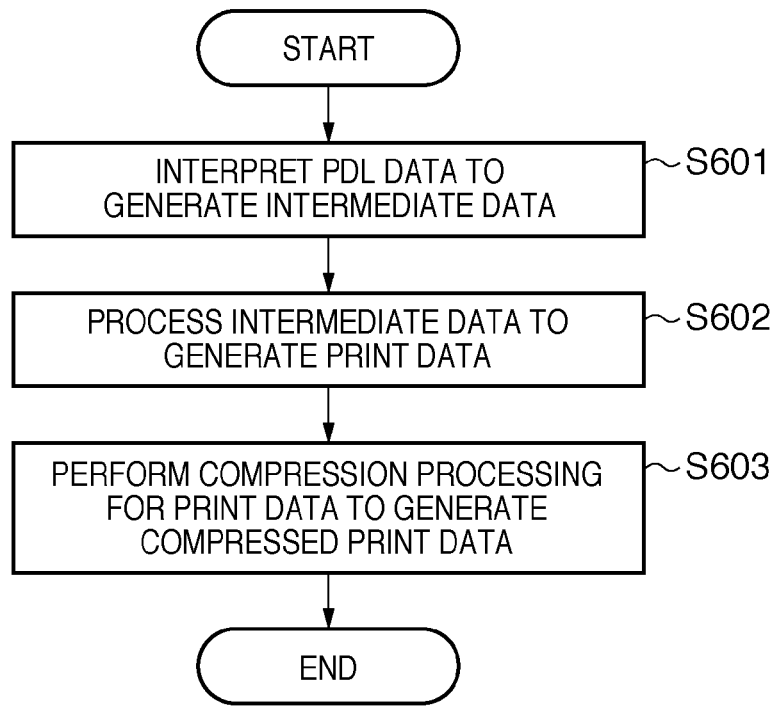
FIG. 6 is a flowchart showing print data generation processing.

Processing of generating intermediate data 700 from the PDL data 200 by the general-purpose processor 501 and RIP ASIC 502 of the image formation processing unit 123, and further generating the print data 400 will be explained in more detail with reference to FIG. 6.

In step S601, the general-purpose processor 501 interprets the PDL data 200 and generates the intermediate data 700. Note that a plurality of types of PDL data 200 are known, including PDF available from Adobe Systems, Incorporated, PostScriopt®, and LIPS® available from Canon Inc. The general-purpose processor 501 generates the intermediate data 700 in a common data format from the PDL data 200 for which various data formats exist.

Figure 7:
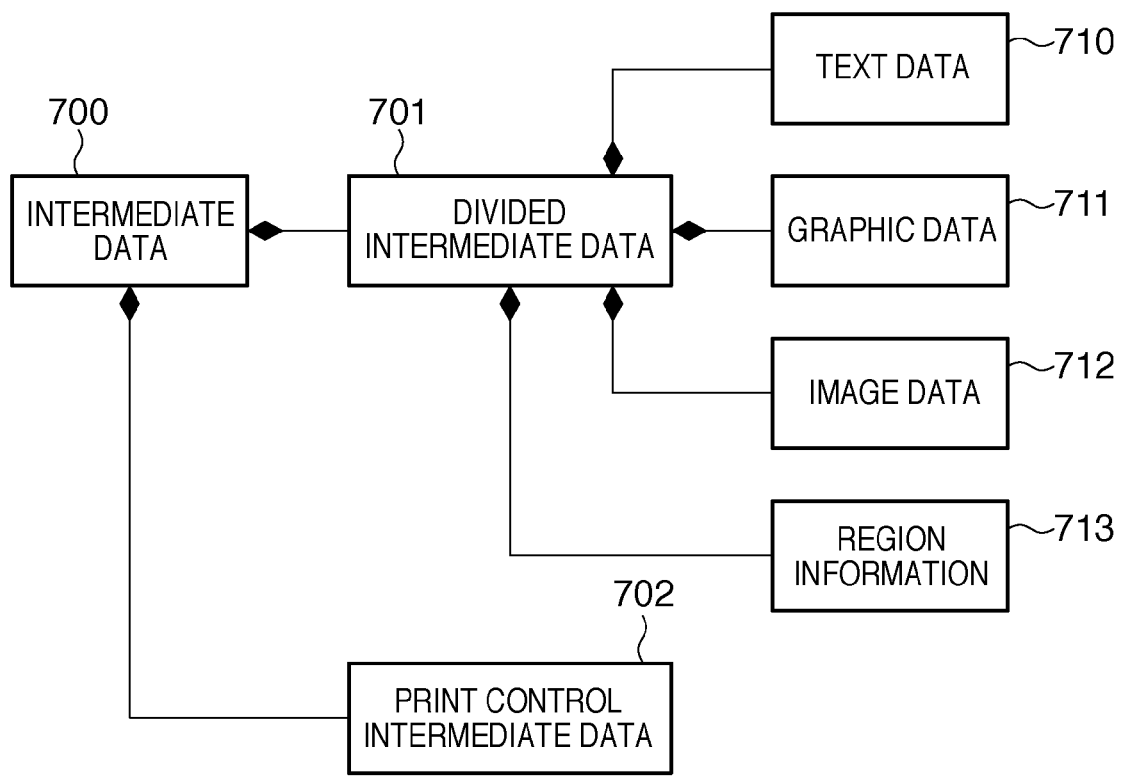
FIG. 7 is a view showing the structure of intermediate data.

The intermediate data 700 will be explained with reference to FIG. 7. The general-purpose processor 501 divides image data of one page described by the PDL data 200 into image data each having a predetermined size (32×32 pixels in the embodiment), and generates intermediate data for all divided data. An image block of a 32×32 pixel size will be called a tile. Note that the tile size is not limited to 32×32 pixels (for example, the size may be 64×64 pixels). The intermediate data 700 generated from the PDL data has intermediate data 701 of each divided tile and print control intermediate data 702. The intermediate data 701 of each divided tile has text data 710, graphic data 711, and image data 712 which are to be rendered in the tile, and region information 713.

The print control intermediate data 702 is generated based on at least the print control data 202. The print control data 202 can have information indicating at least a medium size (for example, paper size) for image formation, and a bookbinding processing method.

In step S602, the RIP ASIC 502 receives the intermediate data 700 generated in step S601, and generates the print data 400 from the received intermediate data 700. The print data 400 will be explained with reference to FIG. 4. The RIP ASIC 502 rasterizes the intermediate data 701 of each tile contained in the received intermediate data 700, generating raster image data of each tile. The image compression processing unit 521 in the RIP ASIC 502 compresses raster image data of each tile by compression processing (to be described later), converting it into compressed raster image data 411 of each tile. When the intermediate data 701 is rasterized to generate raster image data of each tile, attribute data 412 indicating the attribute of each pixel contained in each tile is also generated. More specifically, the RIP ASIC 502 generates, from the intermediate data 700, the print data 400 containing the compressed raster image data 411 divided for each tile, and the attribute data 412 divided for each tile. Print engine control data 402 is generated based on at least the print control intermediate data 702. The RIP ASIC 502 transfers the generated print data 400 to the main memory 505 to save it. In the embodiment, the print data 400 is transmitted from the RIP ASIC 502 to the image processing ASIC 503 via the main memory 505.

In step S603, the image processing ASIC 503 acquires the print data 400 from the main memory 505, and performs image processing based on the acquired print data 400. The image processing ASIC 503 uses the image compression processing unit 531 to decompress the compressed raster image data 411 of each tile contained in the print data 400 (expand the compressed data). Then, the image processing ASIC 503 executes image processing for the decompressed raster image of each tile. The image processing ASIC 503 uses the image compression processing unit 531 to compress again the raster image data of each tile having undergone the image processing, generating the print data 400 having undergone the image processing. The print data having undergone the image processing is transferred to and saved in the main memory 505.

Figure 13:
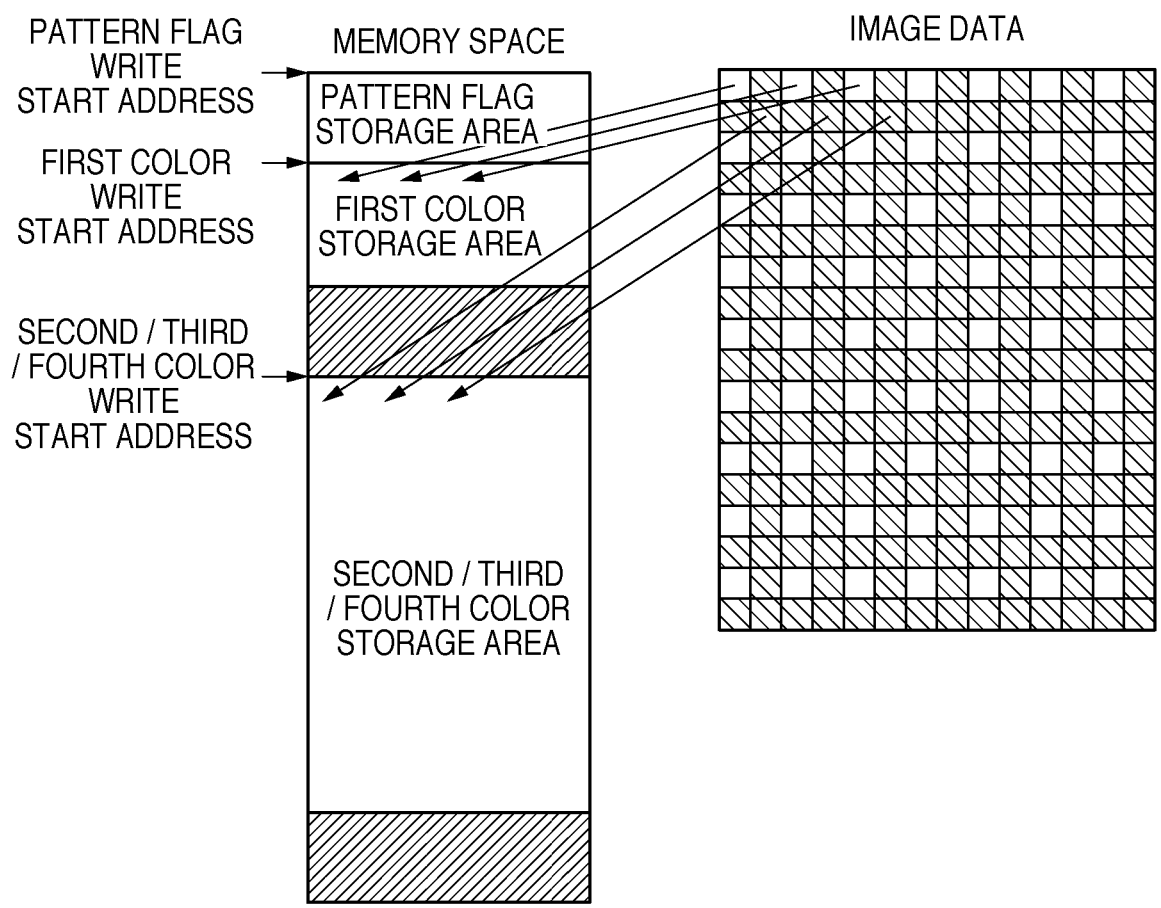
FIG. 13 is a view showing the memory arrangement of compressed raster image data.

When the type of image processing is color processing which is completed by one pixel input and one pixel output, no raster image need be returned to the image compression processing unit 531, and compressed data stored as shown in FIG. 13 may be processed, which will be described later.

By the above processing, the image formation processing unit 123 can generate the print data 400. In step S304 described above, the image formation processing unit 123 transmits, to the print engine, the print data 400 which is saved in the main memory 505 after image processing.

[Attribute Data]

Figure 8:
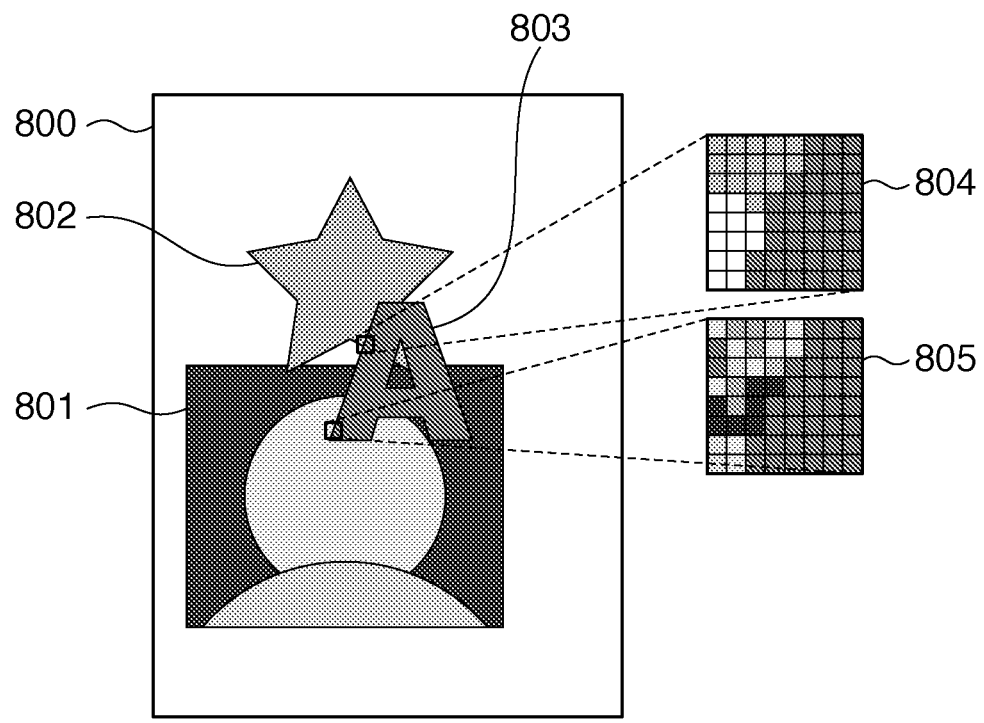
FIG. 8 is a view showing a state in which an image having a plurality of types of attributes is formed on a medium.
Figure 9:
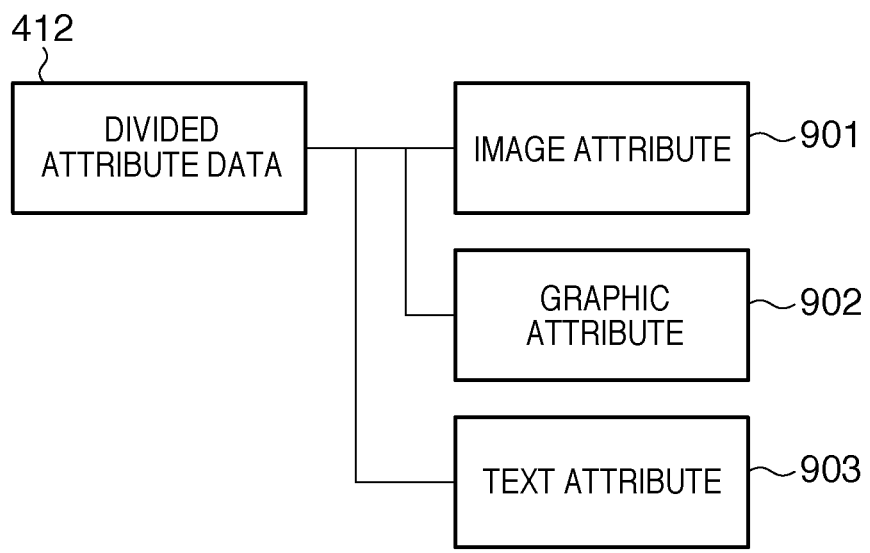
FIG. 9 is a view showing the structure of divided attribute data.

Details of the attribute data 412 generated in step S602 will be explained with reference to FIGS. 8 to 10. As shown in FIG. 8, an image having a plurality of types of attributes is formed on a printing medium 800 such as paper. For example, a 1-page image includes an image object 801 with the image attribute, an image object 802 with the graphic attribute, and an image object 803 with the text attribute. When the 1-page image is divided into tiles, respective pixels contained in each tile have a plurality of attributes. For example, a tile 804 includes pixels with the text attribute and those with the graphic attribute. A tile 805 includes pixels with the text attribute and those with the image attribute. The attribute data 412 divided for each tile in raster image data 401 of the print data 400 shown in FIG. 4 includes at least one of these three types of attribute data. As shown in FIG. 9, the three types of attribute data are an image attribute 901, graphic attribute 902, and text attribute 903. At this time, the attribute data 412 of each tile is an attribute map of a 32×32 pixel size.

The embodiment assumes that attribute data of each pixel is given by 3 bits. As shown in FIG. 10, a corresponding pixel has the image attribute 901 for the first bit=1, the graphic attribute 902 for the second bit=1, and the text attribute 903 for the third bit=1.

Note that the embodiment defines the image attribute, graphic attribute, and text attribute, but the attributes are not limited to these three types.

[Compression Processing Accompanied by Color-reduction Processing]

As described above, according to the embodiment, compression processing is done for raster image data of each tile in step S603. The compression processing will be explained in more detail with reference to FIGS. 11 to 15.

Figures 10, 11:
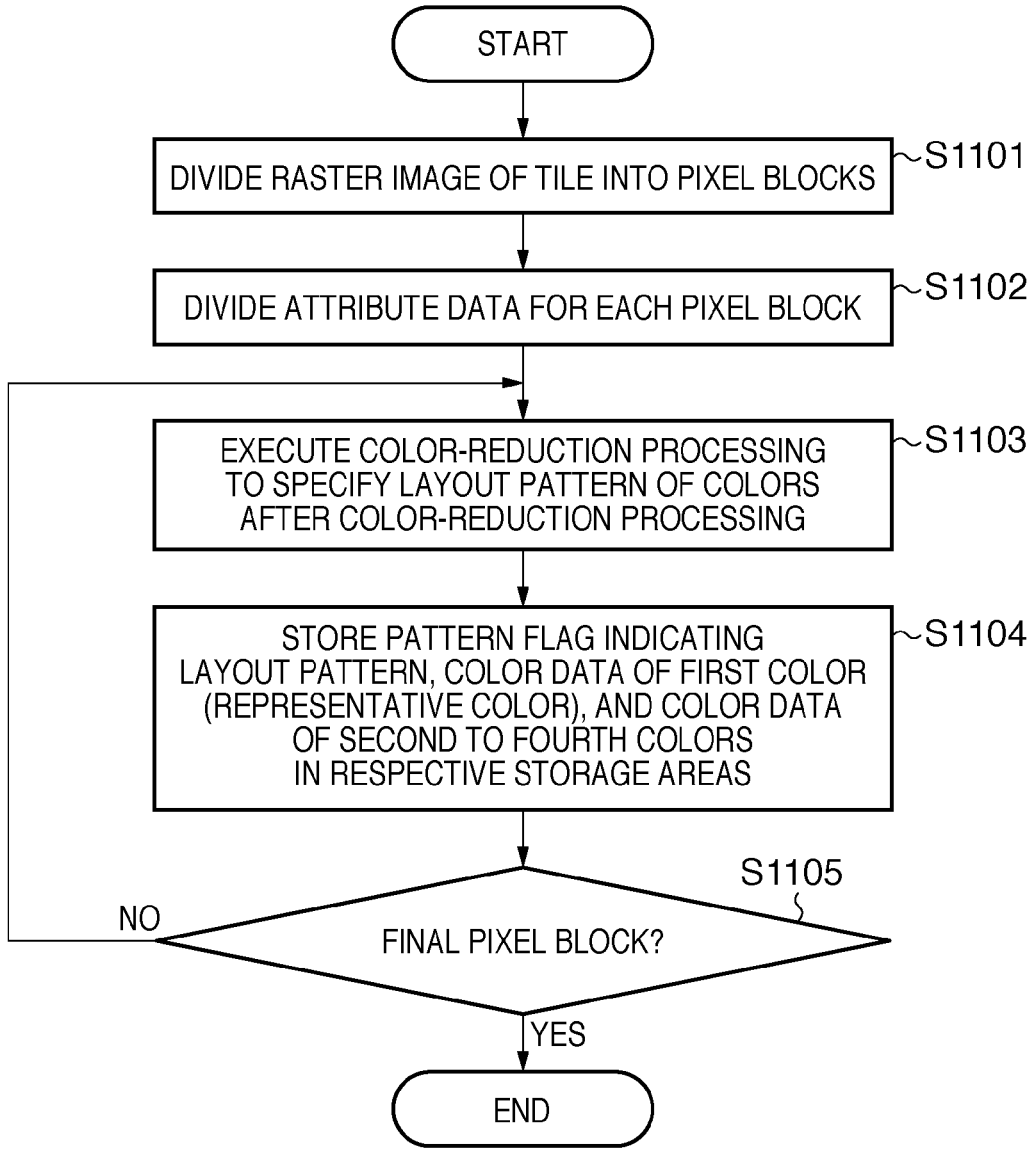
FIG. 10 is a table showing the bit configuration of the divided attribute data.
FIG. 11 is a flowchart showing image compression processing.

FIG. 11 is a flowchart showing image compression processing by the image compression processing unit. First, the image compression processing unit 521 divides raster image data of each tile into pixel blocks (step S1101). As shown in FIG. 12, the divided pixel block has a predetermined size (2×2 size in this example). However, the present invention can be practiced even if the size of a divided pixel block is a size (M×N pixels) other than the predetermined one.

Figure 14:
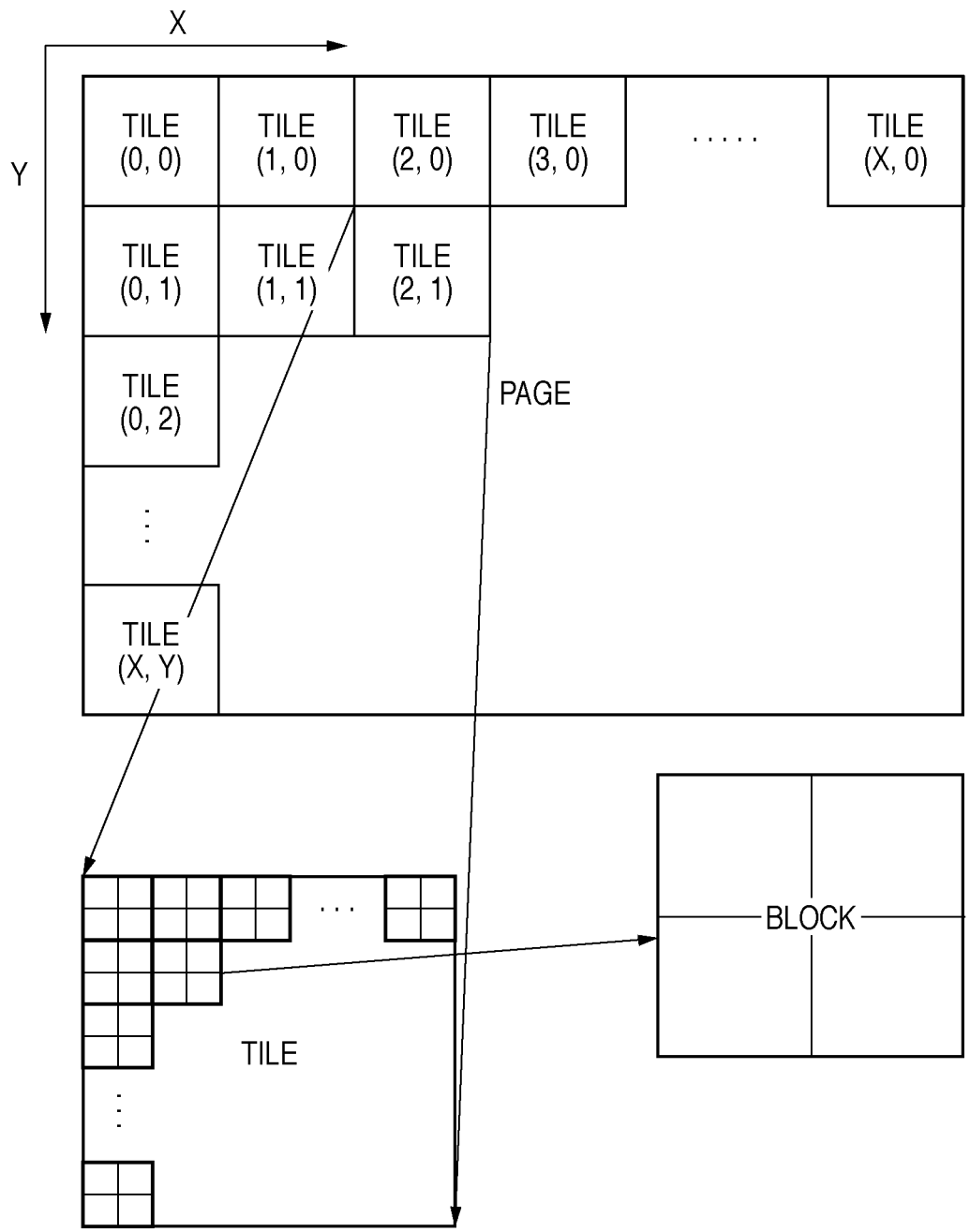
FIG. 14 is a view showing a concept up to division into pixel blocks.

FIG. 14 is a conceptual view showing the relationship between the raster image of one page, that of each tile, and each pixel block. In the embodiment, a 1-page image is divided into tiles, each of 32×32 pixels, and each tile is further divided into blocks, each of 2×2 pixels. The embodiment performs compression processing for each tile. As a matter of course, the present invention can be practiced even using a division method other than the aforementioned size and shape.

Then, the image compression processing unit 521 divides even the attribute data 412 of each tile in accordance with corresponding pixel blocks (step S1102). That is, even the attribute data is divided for each block of a predetermined size (2×2 size in the embodiment).

The image compression processing unit 521 targets one pixel block, executes color-reduction processing based on color data of each pixel and corresponding attribute data, and specifies a color layout pattern in the pixel block after the color-reduction processing and color data after the color-reduction processing (step S1103). In this case, a layout pattern is specified by comparing color data of respective pixels in the pixel block after the color-reduction processing, and determining which pattern in FIG. 12 matches the color layout based on pixels whose color data coincide with each other. The specified layout pattern can be coded as one of pattern flags (0 to E) each indicting a layout pattern, as shown in FIG. 12.

Since each pattern indicating the layout of colors in a block is associated with a pattern flag shown in FIG. 12, the number of colors and color data in each block can be specified if a pattern flag is obtained. The embodiment defines the color (pixel value) of an upper left pixel as color data of the first color (first color data (representative color)) in all patterns.

For pattern flag 0, the number of colors is one, and the color (pixel value) of an upper left pixel is extracted as the first color. For pattern flags 1 to 7, the number of colors is two, the color (pixel value) of an upper left pixel is extracted as the first color, and the color (pixel value) of a pixel at a position where there is the second color (second color data) defined in accordance with each pattern flag is extracted. For example, for pattern flag 1, the color of an upper right pixel is extracted as the second color. For pattern flags 8 to D, the number of colors is three, the color (pixel value) of an upper left pixel is extracted as the first color, and the colors (pixel values) of pixels at positions where there are the second color (second color data) and third color (third color data) defined in accordance with each pattern flag are extracted. For example, for pattern flag 8, the color (pixel value) of an upper right pixel is extracted as the second color, and that of a lower right pixel is extracted as the third color. For pattern flag E, the color of an upper left pixel is extracted as the first color, that of an upper right pixel is extracted as the second color, that of a lower left pixel is extracted as the third color, and that of a lower right pixel is extracted as the fourth color.

In this way, the number of colors of a pixel block after color-reduction processing is specified based on the result of comparing pixels contained in each pixel block after color-reduction processing, and a corresponding pattern flag and color data can be specified. In the embodiment, the color of an upper left pixel in a 2×2 pixel block is defined as the first color. However, the pixel position is not limited to an upper left pixel (for example, the layout pattern may be defined such that the color of a lower right pixel serves as the first color).

The image compression processing unit 521 stores, in respective memory storage areas, the pattern flag, color data of the first color, and those of the second to fourth colors which have been determined in step S1103 (step S1104). More specifically, all the pattern flags of respective blocks are stored in a pattern flag storage area (memory area for storing pattern flags) in the memory, as shown in FIG. 13. Also, all the (first) color data of the first color of respective blocks are stored in the first color storage area (memory area for storing the first color data of respective blocks) in the memory. Further, all the color data of the second to fourth colors of respective blocks are stored in the second/third/fourth color storage area (memory area for storing the second to fourth color data of respective blocks) in the memory. Although not shown in FIG. 13, even attribute data of respective pixels contained in the image are stored in the memory.

These processes are repeated up to the final pixel block (step S1107). The image compression processing unit 521 can therefore convert raster image data of each tile into the compressed raster image data 411.

In FIG. 13, color data of pixels are stored in memory areas (first color storage area and second/third/fourth color storage area) after the first color write start address without changing the number of bits. The color (pixel value) of each pixel can be specified without decoding compressed data into a raster image, unlike JPEG compressed data. When performing color processing which is completed by one pixel input and one pixel output (for example, color conversion or gamma correction processing using an LUT or color space conversion processing using a matrix operation), data stored as shown in FIG. 13 can be directly processed without restoring it into a raster image. When the image processing ASIC 503 executes image processing for each pixel, pixel data after the first color write start address in the memory are read out, and after processing for each pixel, written back in the memory. At this time, if the number of bits of a pixel does not change by any pixel processing, overwriting at the same location in the memory can save the memory.

Figure 15:
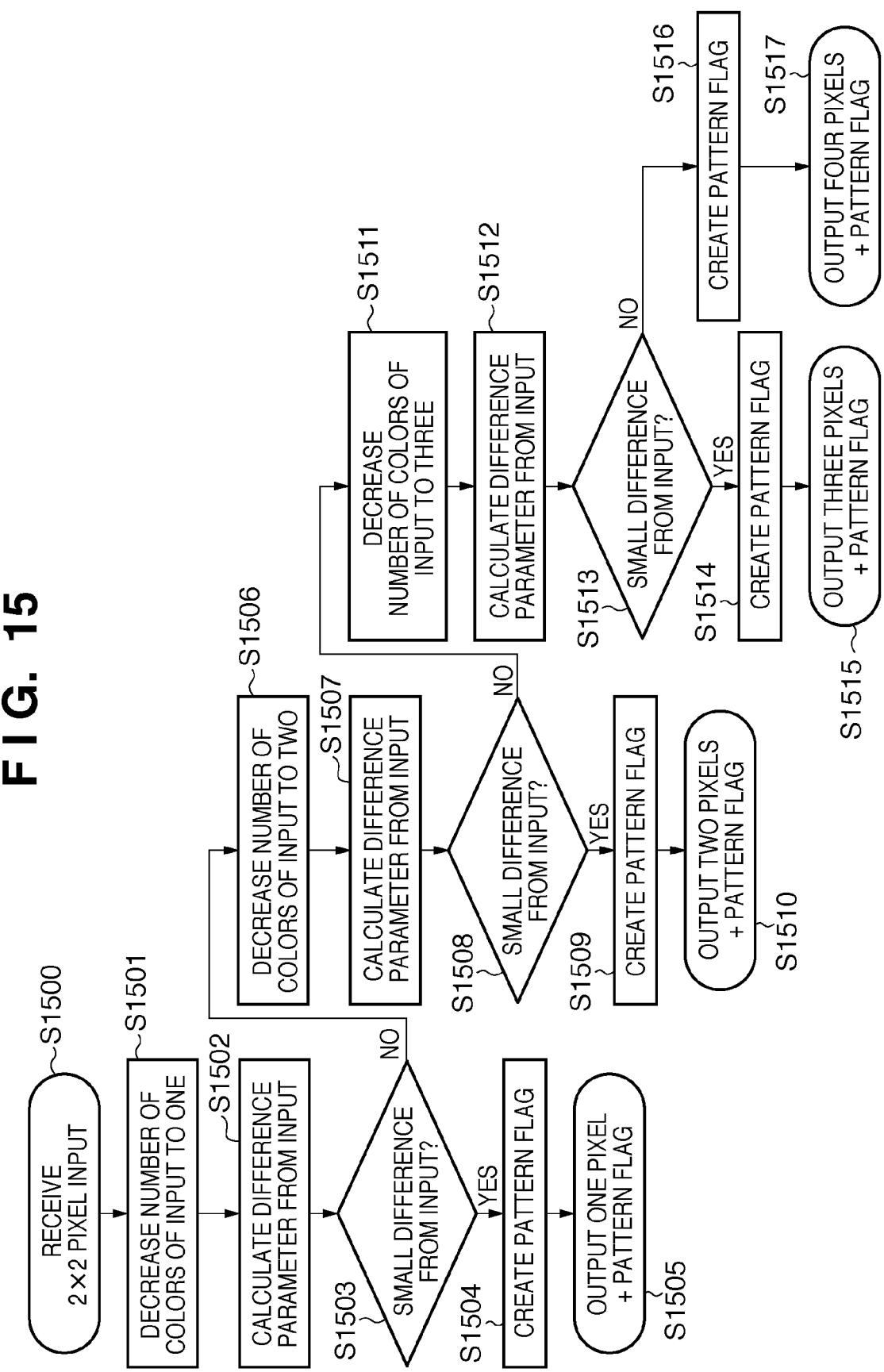
FIG. 15 is a flowchart showing processing of integrating color information of pattern information.

Details of the color-reduction processing executed in step S1103 will be described with reference to FIG. 15. This example assumes that input color information has 256 tones represented by 8 bits for each of R, G, and B colors. The present invention can be practiced even with another input pixel value. In Japanese Patent Laid-Open No. 2008-271046, the number of colors in a 2×2 block is always decreased to two or less colors. In the embodiment, however, color-reduction processing is done based on the attribute in a 2×2 pixel block for higher image quality, and the maximum permissible number of colors of each block after color-reduction processing is four.

First, the image compression processing unit 521 receives a 2×2 pixel block (step S1500), and performs color-reduction processing to decrease the number of colors of data of four pixels in the pixel block to one (step S1501). The number of colors is decreased to one by, for example, calculating the average pixel value of four pixels.

Then, the image compression processing unit 521 calculates a difference parameter between the pixel value having undergone color-reduction processing and the pixel values of the four pixels (step S1502). The "difference parameter" can be obtained as follows.

More specifically, the difference parameter is obtained by the following numerical conversion based on a color information pattern and attribute data pattern in the pixel block. First, the difference (color difference) between pixels at corresponding positions in a block before color-reduction processing and a block after color-reduction processing to one color are obtained for each of four pixels of the block. That is, a change of color data of each pixel before and after color-reduction processing is obtained as a color difference. Then, weight values are obtained based on attribute data of the respective pixels. The attribute data weight value can be obtained from a predetermined table as exemplified in FIG. 16. For example, the attribute data weight value is 2 when the pixel of interest has the graphic or text attribute, and 1 when it has the image attribute. The image compression processing unit 521 calculates the product of the color difference before and after color-reduction processing and the attribute data weight value for each pixel. Further, the image compression processing unit 521 sets, as the difference parameter in the block, the sum of products calculated for the respective pixels contained in the block (step S1502).

The image compression processing unit 521 determines based on this difference parameter whether color-reduction processing greatly degrades the image quality (step S1503). If the color difference parameter is larger than a reference value, the image compression processing unit 521 determines that the image quality degrades greatly, cancels the immediately preceding color-reduction processing (decrease of the number of colors to one), and advances to step S1506. If the difference parameter is smaller than the reference value, the image compression processing unit 521 determines that the image quality hardly degrades, and employs the immediately preceding color-reduction processing (decrease of the number of colors to one), and assigns a pattern flag "0" after color-reduction processing (step S1504). The image compression processing unit 521 outputs the pixel value of one color after color-reduction processing and the pattern flag "0" (step S1505).

Figures 16, 17:
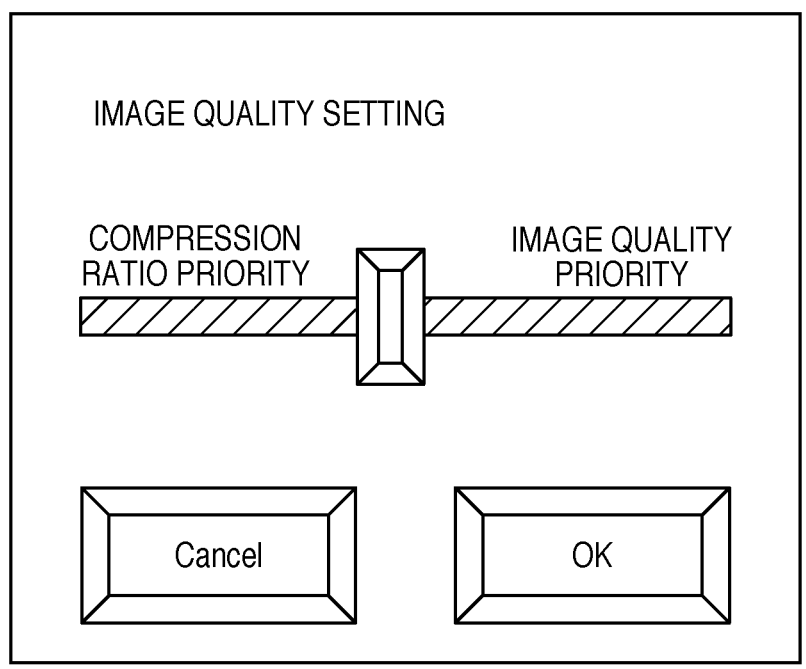
FIG. 16 is a table showing an attribute data weight value.
FIG. 17 is a view showing a UI screen for image quality setting.

The reference value used to determine whether color-reduction processing greatly degrades the image quality is a value saved in the main memory 505 or ROM 506 of the image formation processing unit 123. In this example, the saved reference value can be changed by setting on a UI (User Interface) screen as shown in FIG. 17. Needless to say, the present invention can be practiced even if the reference value is determined by another method.

If the image compression processing unit 521 determines in step S1503 that the image quality degrades greatly, it tries to decrease the number of colors of the target 2×2 pixel block to two (step S1506). More specifically, the image compression processing unit 521 extracts two pixels A and B, the difference between RGB values of which is largest among four pixels in the pixel block. Then, the image compression processing unit 521 clusters the remaining two pixels based on similarity to A or B. The image compression processing unit 521 calculates the average values of the respective clusters, obtaining two colors.

Similar to step S1502, the image compression processing unit 521 calculates a difference parameter based on the difference (color difference) between color data in each pixel before and after the decrease to two colors, and the attribute weight value of each pixel (step S1507). More specifically, the image compression processing unit 521 calculates the product of the color difference before and after the decrease to two colors and the attribute data weight value for each pixel. Further, the image compression processing unit 521 sets, as the difference parameter in the block, the sum of products calculated for the respective pixels contained in the block. Thereafter, the image compression processing unit 521 determines whether the image quality degrades greatly, similar to step S1503 (step S1508). If the image compression processing unit 521 determines that the difference is small and the image quality hardly degrades, it adopts a two-color pattern, and assigns a pattern flag (one of 1 to 7) which matches the two-color layout pattern after color-reduction processing (step S1509). The image compression processing unit 521 outputs the pixel values of two colors after color-reduction processing and the pattern flag (step S1510).

If the image compression processing unit 521 determines in step S1508 that the image quality degrades greatly, it tries color-reduction processing to three colors (step S1511). In the embodiment, the image compression processing unit 521 extracts two pixels, the difference between RGB values of which is smallest among four pixels, and averages the values of the two pixels. The image compression processing unit 521 decreases the number of colors of the four pixels in the block to three using the average value and the values of the remaining two pixels.

Similar to step S1502, the image compression processing unit 521 calculates a difference parameter based on the color data difference (color difference) between pixels after the decrease to three colors and four input pixels, and the attribute weight value of each pixel (step S1512). More specifically, the image compression processing unit 521 calculates the product of the color difference before and after the decrease to three colors and the attribute data weight value for each pixel. Further, the image compression processing unit 521 sets, as the difference parameter in the block, the sum of products calculated for the respective pixels contained in the block. Then, the image compression processing unit 521 determines whether the image quality degrades greatly, similar to step S1503 (step S1513). If the image compression processing unit 521 determines that the difference is small and the image quality hardly degrades, it adopts a three-color pattern, and assigns a pattern flag (one of 8 to D) which matches the three-color layout pattern after color-reduction processing (step S1514). The image compression processing unit 521 outputs the pixel values of three colors after color-reduction processing and the pattern flag (step S1515).

If the image compression processing unit 521 determines in step S1513 that the image quality degrades greatly, it assigns the pixel values of all the four colors and a corresponding pattern flag "E" (step S1516). The image compression processing unit 521 outputs the pixel values of all the four input pixels and the pattern flag (step S1517). In this case, color-reduction processing greatly degrades the image quality for the target pixel block. Hence, the image compression processing unit 521 outputs the pixel values (color data) of the four pixels and the pattern flag without executing color-reduction processing.

The above-described embodiment has the following effects for an image in which information at the boundary of a text or graphic greatly affects the image quality, like a PDL image. For a pixel having the text attribute or graphic attribute, the difference parameter is obtained with heavy weight. Integrating the color of a text or graphic pixel with that of another pixel to decrease the number of colors is suppressed, thereby suppressing degradation of the image quality.

Even if the number of colors is decreased much more, information at the boundary of a text or graphic can be maintained, like a PDL image. The above-described compression method can reduce the data amount to be communicated via the local bus 507, and high-quality image formation becomes possible at low cost.

In addition, high-quality compression processing can be achieved by compression processing lower in cost than compression accompanied by DCT processing. Implementation of high-compression processing with high image quality can suppress the costs of the memory and bus, providing a low-cost image forming apparatus.

[Modification 1]

In the above-described embodiment, compression processing accompanied by color-reduction processing is executed as follows. The image compression processing unit calculates the difference parameter as the sum of the products of attribute data weight values and color difference parameters. The attribute data weight value can be obtained using a table which uniquely determines one value in accordance with attribute data, as shown in FIG. 16. However, the present invention can be practiced even using another method. Processing associated with modification 1 in compression processing accompanied by color-reduction processing in the embodiment will be explained.

First, the image compression processing unit 521 receives a 2×2 pixel block (step S1500), and performs color-reduction processing to decrease the number of colors of the data of the four pixels in the pixel block to one (step S1501). The number of colors is decreased to one by, for example, calculating the average pixel value of four pixels. Then, the image compression processing unit 521 calculates a difference parameter between pixel values having undergone color-reduction processing and the pixel values of the four pixels (step S1502).

In modification 1, the attribute data weight value used to calculate the difference parameter is determined by an attribute pattern shown in FIG. 18, instead of using the table shown in FIG. 16. The attributes of four input pixels are checked from attribute data which are contained in the divided attribute data 412 and correspond to the respective pixels. One of attribute patterns shown in FIG. 18 that corresponds to these attributes is determined. An attribute data weight value corresponding to the matching attribute pattern and the sum of color differences are multiplied to obtain a difference parameter. Subsequent processes are the same as those in the above embodiment, and a description thereof will not be repeated. The attribute pattern and attribute data weight value shown in FIG. 18 may be set in a table in advance.

This arrangement can suppress execution of color-reduction processing for a specific attribute pattern, in addition to the effects of the above embodiment. Also, the raster image data compression ratio can be increased by more frequently performing color-reduction processing for attribute patterns other than a specific one, in addition to the effects of the above embodiment. More specifically, modification 1 can suppress color-reduction processing in a small text or thin text whose image quality readily drops. Image compression processing accompanied by color-reduction processing can be performed while keeping the image quality high.

[Modification 2]

Figure 19:
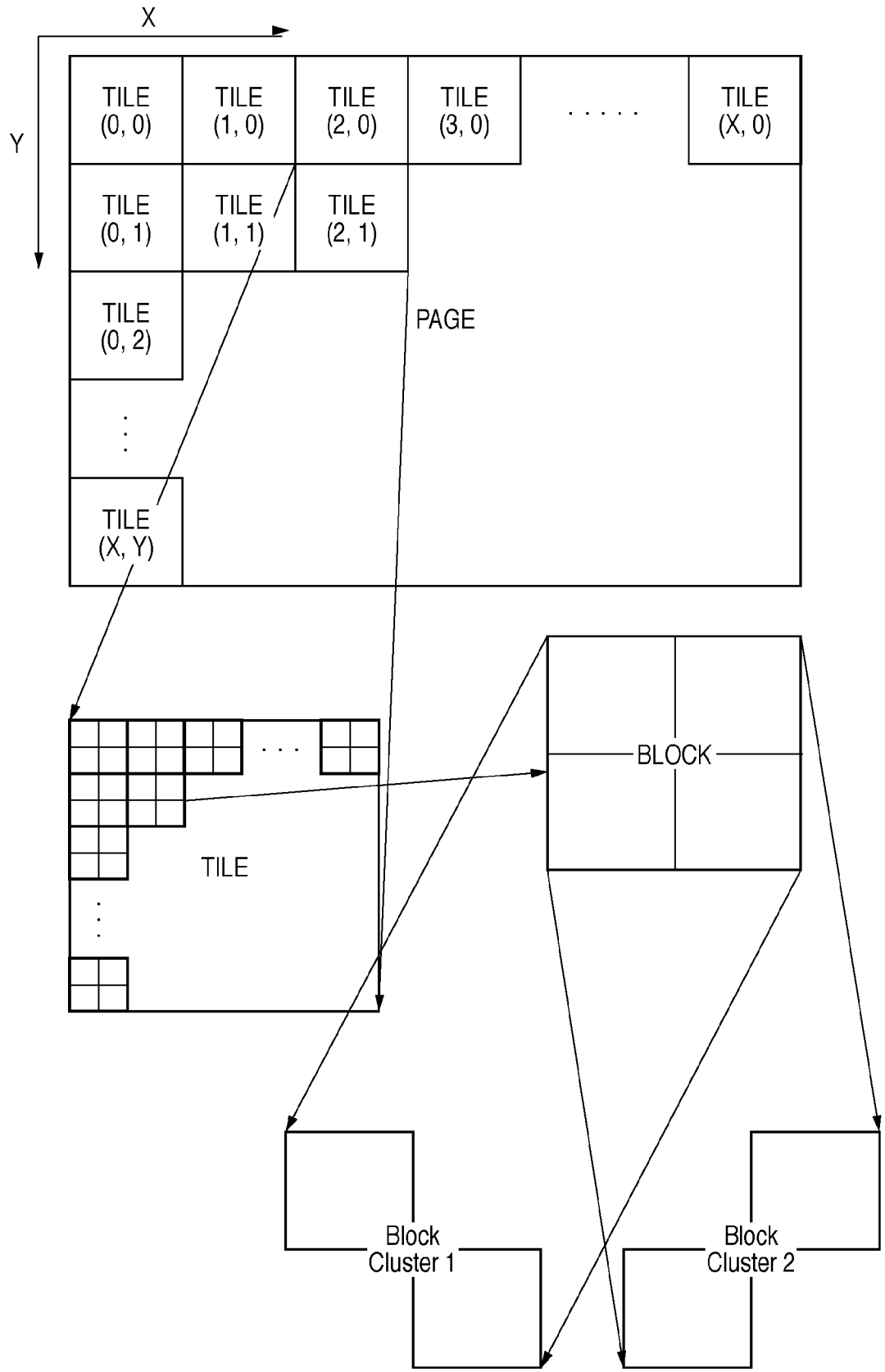
FIG. 19 is a view showing a concept up to division into block clusters.

In the above-described embodiment or modification 1, the attribute data weight value is determined using the table shown in FIG. 16 or the attribute pattern shown in FIG. 18 in compression processing accompanied by color-reduction processing. In modification 2, a divided 2×2 pixel block is further divided into block clusters shown in FIG. 19, and compression processing accompanied by color-reduction processing is done for each block cluster.

Figure 20:
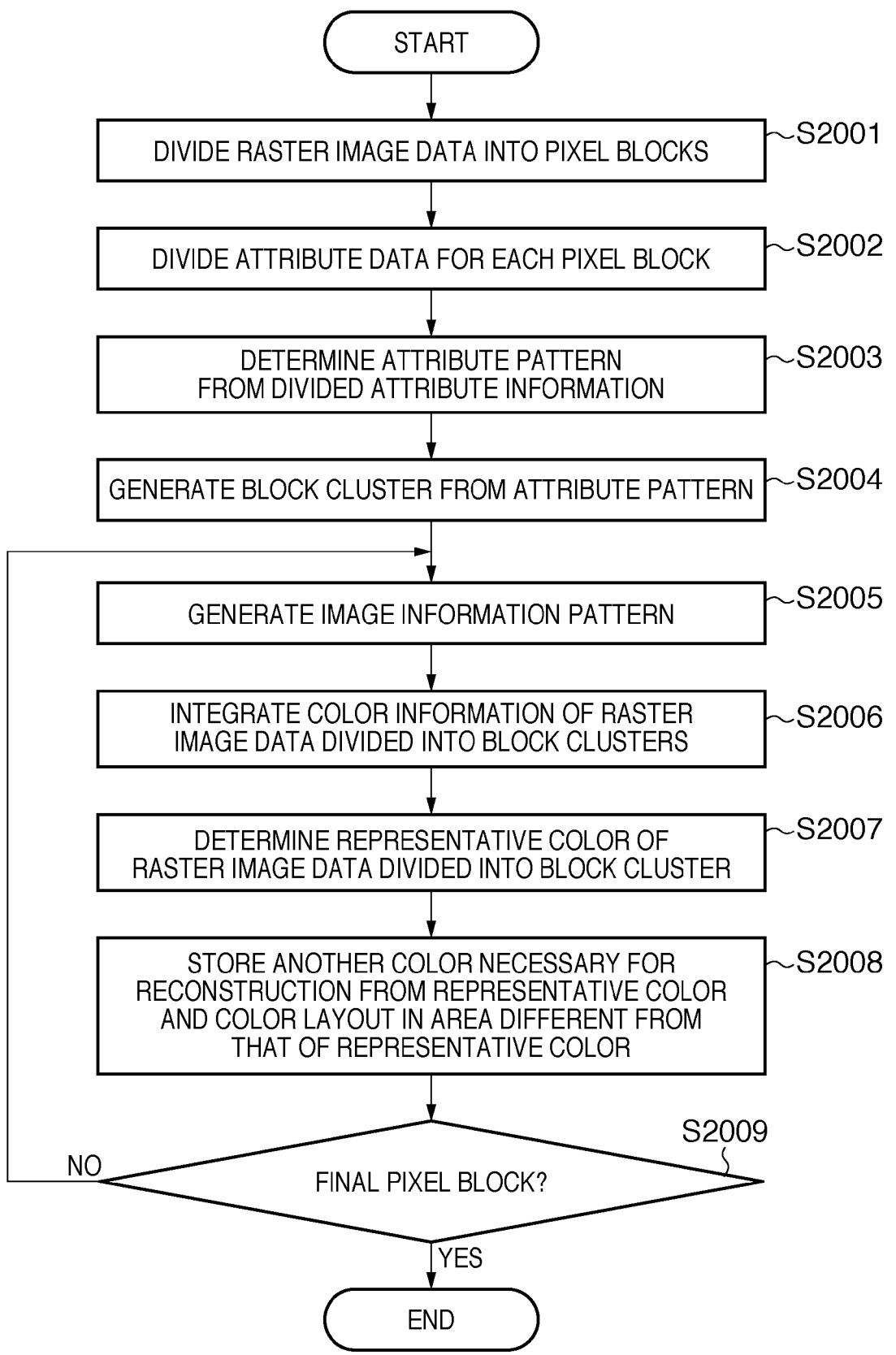
FIG. 20 is a flowchart showing image compression processing in modification 2.

FIG. 20 is a flowchart showing image compression processing in modification 2. Processes in steps S2001, S2002, and S2005 to S2009 shown in FIG. 20 correspond to those in FIG. 11 in the above embodiment. Processing associated with modification 2 will be explained.

In step S2003, similar to modification 1, the attributes of four input pixels are checked from attribute data, and one of attribute patterns shown in FIG. 21 that corresponds to these attributes is determined. In step S2004, a block shape corresponding to the matching attribute pattern is determined as block clusters. In processes of subsequent steps S2005 to S2008, compression processing is executed similarly to the above embodiment for raster image data divided into the block clusters.

This arrangement can prevent color-reduction processing executed between specific attributes, in addition to the effects of the above embodiment and modification 1. Further, the raster image data compression ratio can be increased by more frequently performing color-reduction processing for attribute patterns other than a specific one. More specifically, modification 2 can prevent color-reduction processing at the edge of a text where the image quality readily drops. Image compression processing accompanied by color-reduction processing can be done while keeping the image quality high.

[Modification 3]

Image formation processing in the above-described embodiment is performed using the RIP ASIC, image processing ASIC, and the like. However, the present invention can be practiced even when the general-purpose processor executes part or all of image formation processing.

Also, the present invention can be practiced even when a processing device other than the general-purpose processor executes part or all of processing performed by the RIP ASIC or image processing ASIC. For example, the present invention can be practiced even when part or all of processing is performed using a DSP, FPGA, configurable processor, or reconfigurable processor.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189984, filed Aug. 26, 2010, which is hereby incorporated by reference herein in its entirety.

What is claimed is:

1. An image processing apparatus comprising:
a color-reduction processing unit which divides image data into blocks each of a 2×2 pixel size, sequentially targets the divided blocks, and performs color-reduction processing for the target block based on color data and attribute data of respective pixels forming the target block, wherein a number of colors decreased for each target block in the color-reduction processing is determined by multiplying a color difference before and after the color-reduction processing for each pixel in each target block by a weight that is determined based on attribute data of pixels included in each target block;
a specifying unit which specifies a pattern flag indicating a layout pattern of color data contained in the target block by comparing the color data of the respective pixels in the target block having undergone the color-reduction processing by said color-reduction processing unit;
an extraction unit which extracts, as color data of a first color, color data corresponding to a pixel at a position defined in advance in the block of the 2×2 pixel size having undergone the color-reduction processing by said color-reduction processing unit, and when the number of colors contained in the block having undergone the color-reduction processing is determined to be one of two to four, extracts color data of second to fourth colors corresponding to the layout pattern defined for the specified pattern flag; and
an output unit which outputs the pattern flag of the block that has been specified by said specifying unit, the color data of the first color of the block that has been extracted by said extraction unit, and the color data of the second to fourth colors of the block that have been extracted by said extraction unit.

2. The apparatus according to claim 1, wherein said color-reduction processing unit multiplies the color difference before and after the color-reduction processing for each pixel in each target block by the weight determined based on the attribute data of the pixels included in each target block, and determines, based on a sum of products calculated for respective pixels in the target block, the number of colors decreased for each target block.

3. The apparatus according to claim 1, wherein the weight for a pixel whose attribute data indicates one of a text and graphic is heavier than the weight for a pixel whose attribute data indicates an image.

4. The apparatus according to claim 1, wherein the image data is one of a tile image having a 32×32 pixel size and a tile image having a 64×64 pixel size.

5. The apparatus according to claim 1, wherein the image data is image data generated based on PDL data.

6. An image processing method comprising:
a color-reduction processing step of dividing image data into blocks each of a 2×2 pixel size, sequentially targeting the divided blocks, and performing color-reduction processing for the target block based on color data and attribute data of respective pixels forming the target block, wherein a number of colors decreased for each target block in the color-reduction processing is determined by multiplying a color difference before and after the color-reduction processing for each pixel in each target block by a weight that is determined based on attribute data of pixels included in each target block;
a specifying step of specifying a pattern flag indicating a layout pattern of color data contained in the target block by comparing the color data of the respective pixels in the target block having undergone the color-reduction processing in the color-reduction processing step;
an extraction step of extracting, as color data of a first color, color data corresponding to a pixel at a position defined in advance in the block of the 2×2 pixel size having undergone the color-reduction processing in the color-reduction processing step, and when the number of colors contained in the block having undergone the color-reduction processing is determined to be one of two to four, extracting color data of second to fourth colors corresponding to the layout pattern defined for the specified pattern flag; and
an output step of outputting the pattern flag of the block that has been specified in the specifying step, the color data of the first color of the block that has been extracted in the extraction step, and the color data of the second to fourth colors of the block that have been extracted in the extraction step.

7. A non-transitory computer-readable recording medium recording a program for causing a computer to execute an image processing method defined in claim 6.

8. An image processing apparatus comprising:
a color-reduction processing unit which divides image data into blocks each of an M×N pixel size, sequentially targets the divided blocks, and performs color-reduction processing for the target block based on color data and attribute data of respective pixels forming the target block, wherein a number of colors decreased for each target block in the color-reduction processing is determined by multiplying a color difference before and after the color-reduction processing for each pixel in each target block by a weight that is determined based on attribute data of pixels included in each target block;
a specifying unit which specifies a pattern flag indicating a layout pattern of color data contained in the target block by comparing the color data of the respective pixels in the target block having undergone the color-reduction processing by said color-reduction processing unit;
an extraction unit which extracts, as color data of a first color, color data corresponding to a pixel at a position defined in advance in the block of the M×N pixel size having undergone the color-reduction processing by said color-reduction processing unit, and when the number of colors contained in the block having undergone the color-reduction processing is determined to be at least two, extracts color data other than color data of the first color based on the layout pattern defined for the specified pattern flag; and
an output unit which outputs the pattern flag of the block that has been specified by said specifying unit, the color data of the first color of the block that has been extracted by said extraction unit, and the color data other than the color data of the first color in the block that has been extracted by said extraction unit.

9. An image processing apparatus comprising:
a dividing unit configured to divide image data into blocks each of an M×N pixel size;
a color-reduction processing unit configured to perform color-reduction processing for each divided block based on color data and attribute data of respective pixels forming each divided block, wherein a number of colors decreased for each divided block in the color-reduction processing is determined by multiplying a color difference before and after the color-reduction processing for each pixel in each divided block by a weight that is determined based on attribute data of pixels included in each divided block; and
a compression processing unit configured to store data obtained by coding each divided block for which the color-reduction processing has been performed by the color-reduction processing unit.

10. An image processing method comprising:
a dividing step of dividing image data into blocks each of an M×N pixel size;
a color-reduction processing step of performing color-reduction processing for each divided block based on color data and attribute data of respective pixels forming each divided block, wherein a number of colors decreased for each divided block in the color-reduction processing is determined by multiplying a color difference before and after the color-reduction processing for each pixel in each divided block by a weight that is determined based on attribute data of pixels included in each divided block; and
a compression processing step of storing data obtained by coding each divided block for which the color-reduction processing has been performed in the color-reduction processing step.

11. A non-transitory computer-readable recording medium recording a program for causing a computer to execute an image processing method defined in claim 10.

* * * * *